United States Patent
Levine et al.

(10) Patent No.: US 11,323,856 B2
(45) Date of Patent: *May 3, 2022

(54) SYSTEM, PROCESS, AND DEVICE FOR MULTIPLE NETWORK USAGE TRACKING

(71) Applicant: TracFone Wireless, Inc., Miami, FL (US)

(72) Inventors: Karen Levine, Miami, FL (US); Mansi Srivastava, Miami, FL (US); Carmen Pina, Miami, FL (US); Sonia Guell, Miami, FL (US); Miguel Fernandez, Miami, FL (US); James Zimmerman, Miami, FL (US)

(73) Assignee: TRACFONE WIRELESS, INC., Miami, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/000,714

(22) Filed: Aug. 24, 2020

(65) Prior Publication Data

US 2020/0389769 A1 Dec. 10, 2020

Related U.S. Application Data

(63) Continuation of application No. 16/506,394, filed on Jul. 9, 2019, now Pat. No. 10,757,548, which is a continuation of application No. 15/986,191, filed on May 22, 2018, now Pat. No. 10,349,241, which is a continuation of application No. 15/215,985, filed on Jul. 21, 2016, now Pat. No. 9,980,115.

(60) Provisional application No. 62/195,095, filed on Jul. 21, 2015.

(51) Int. Cl.
| | | |
|---|---|---|
| *H04W 4/24* | (2018.01) | |
| *H04W 8/18* | (2009.01) | |
| *H04M 15/00* | (2006.01) | |
| *H04M 15/02* | (2006.01) | |

(52) U.S. Cl.
CPC ............ *H04W 4/24* (2013.01); *H04M 15/46* (2013.01); *H04M 15/49* (2013.01); *H04M 15/51* (2013.01); *H04M 15/58* (2013.01); *H04M 15/66* (2013.01); *H04M 15/8356* (2013.01); *H04M 15/844* (2013.01); *H04M 15/852* (2013.01); *H04M 15/888* (2013.01); *H04W 8/18* (2013.01)

(58) Field of Classification Search
CPC ......... H04W 4/24; H04W 8/18; H04W 48/18; H04W 4/26; H04W 28/0289; H04M 15/46; H04M 15/66; H04M 15/844; H04L 12/1432
See application file for complete search history.

(56) References Cited

U.S. PATENT DOCUMENTS

| | | | |
|---|---|---|---|
| 2010/0188975 A1* | 7/2010 | Raleigh ............ | H04W 28/0215 370/230.1 |
| 2012/0281540 A1* | 11/2012 | Khan .................. | H04L 61/2007 370/241 |
| 2017/0188480 A1 | 6/2017 | Lee et al. | |

* cited by examiner

*Primary Examiner* — Phuoc H Doan

(57) ABSTRACT

A system for multiple network usage tracking, the system having a policy management platform having one or more processors able to receive and to calculate account usage data associated with an account profile, the policy management platform arranged externally from a network of at least one wireless carrier.

20 Claims, 12 Drawing Sheets

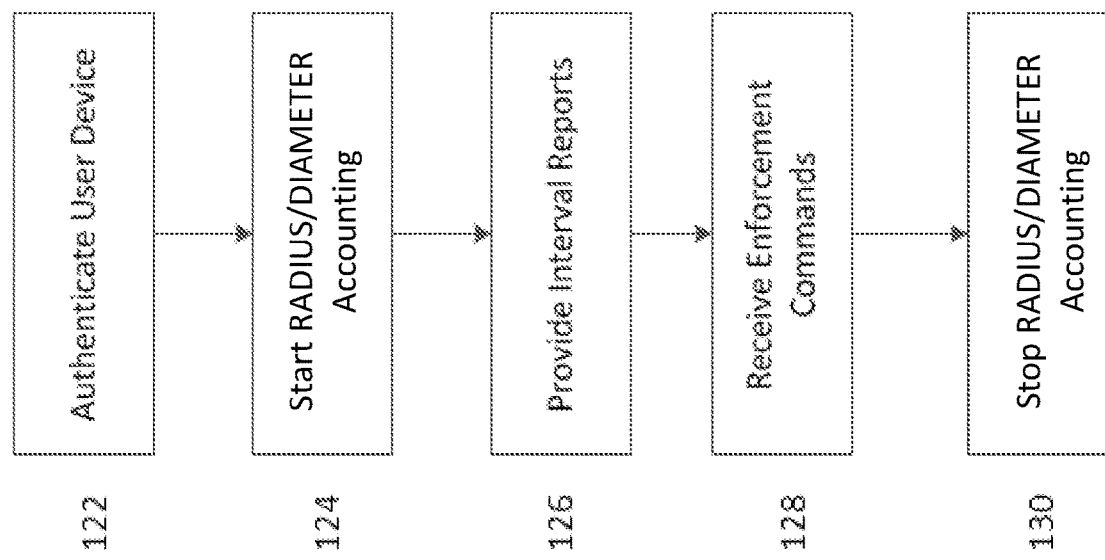

SYSTEM, PROCESS, AND DEVICE FOR MULTIPLE NETWORK USAGE TRACKING

CROSS REFERENCE TO PRIOR APPLICATIONS

This application is a continuation of U.S. patent application Ser. No. 16/506,394, filed Jul. 9, 2019, now U.S. Pat. No. 10,757,548 issued Aug. 25, 2020, which is incorporated herein by reference in its entirety; which is a continuation of U.S. patent application Ser. No. 15/986,191, filed May 22, 2018 now U.S. Pat. No. 10,349,241 issued Jul. 9, 2019, which is incorporated herein by reference in its entirety; which is a continuation of U.S. patent application Ser. No. 15/215,985, filed Jul. 21, 2016 now U.S. Pat. No. 9,980,115 issued May 22, 2018, which is incorporated herein by reference in its entirety. This application also claims the benefit from U.S. Provisional Application No. 62/195,095 filed on Jul. 21, 2015, which is hereby incorporated by reference for all purposes as if fully set forth herein.

BACKGROUND OF THE DISCLOSURE

1. Field of the Disclosure

The disclosure relates to a wireless service provider system and method for tracking multiple network usage associated with a wireless user account. More particularly, the disclosure relates to systems, devices, and methods for tracking and managing usage of any wireless device or combination of wireless devices associated with a wireless account used across multiple networks and wireless carriers.

2. Related Art

Wireless service plans have been contemplated for the use of wireless devices across multiple carriers. However, because different carriers typically employ different systems and platforms to collect usage data and because service plans for use with multiple carriers would typically need to aggregate data from those carriers, it has been found too difficult for service providers to track the usage of such service plans. Existing systems for usage tracking employ a radio infrastructure and mobile packet core networks of wireless carriers. These systems use methods that rely on the inspection of data traffic through a third party vendor. Such reliance can be costly and inefficient.

A need exists to provide a device, system, and method for more efficient and effective tracking and managing wireless device usage across multiple networks.

SUMMARY OF THE DISCLOSURE

The foregoing needs are met, to a great extent, by the disclosure, providing a device, system, and method for tracking and managing wireless device usage across multiple networks.

In one aspect, a system for multiple network usage tracking includes a policy management platform for a network operator, the policy management platform having one or more processors configured to receive, from at least one wireless carrier, and to calculate account usage data associated with an account profile, the policy management platform arranged externally from a network of the at least one wireless carrier.

The policy management platform may be further configured to collect, from at least one gateway support node associated with the at least one wireless carrier, and to aggregate the account usage data associated with the account profile. The policy management platform may be further configured to determine whether the collected and aggregated account usage data associated with the account profile has exceeded a predetermined usage threshold. The policy management platform may be configured to notify an enforcement manager when the account usage data associated with the account profile has exceeded the predetermined usage threshold. The policy management platform may be further configured to transmit a message to a wireless device notifying the wireless device that the account usage data has exceeded a predetermined usage threshold. The policy management platform may be further configured to determine whether the collected and aggregated account usage data for one wireless carrier has reached a predetermined usage threshold. The policy management platform may be further configured to transmit a termination request to the one wireless carrier in response to determining that the collected and aggregated account usage data for the one wireless carrier has reached the predetermined usage threshold. The policy management platform may be further configured to transmit a notification message to a mobile virtual network operator that the account usage data has reached a predetermined usage threshold.

In another aspect, a device for multiple network usage tracking includes one or more processors configured to receive account usage data from a plurality of networks for an account profile associated with a wireless device, aggregate the account usage data from each of the networks for the account profile, determine whether the account usage data from the account profile has reached a predetermined usage threshold, and transmit a termination request to one or more of the networks, the termination request requesting termination of service to the wireless device.

In another aspect, a method for multiple network usage tracking includes receiving with a policy management platform having one or more processors, from at least one wireless carrier, account usage data for an account profile operatively linked to a wireless device registered on the account profile and configured to connect to the at least one wireless carrier, aggregating the account usage data at the policy management platform, and determining with the policy management platform, in response to aggregating the account usage data, whether the account usage data has reached a predetermined usage threshold.

The method may further include transmitting a termination request, with the policy management platform to the at least one wireless carrier, to terminate the connection between the wireless device and the at least one wireless carrier. The receiving the account usage data may further include receiving the account usage data transmitted with at least one of a radius protocol and a diameter protocol from the least one wireless carrier. The predetermined usage threshold for the account may include a usage limit for each wireless carrier. The determining whether the account usage data has reached the predetermined usage threshold may further include determining, with the policy management platform, whether the account usage data for one wireless carrier has reached the usage limit for the one wireless carrier. The method may further include transmitting a termination request, with the policy management platform to the one wireless carrier, to terminate the connection between the wireless device and the one wireless carrier in response to determining that the account usage data for the one wireless carrier has reached the usage limit. The method may further include verifying the account usage data with the policy management platform, where the policy management platform is configured to verify the account usage data with the one wireless carrier. The receiving the account usage data may include receiving the account usage data in predetermined time intervals. The determining whether the account usage data has reached the predetermined usage threshold may further include determining, with the policy management platform, whether the account usage data for two or more wireless carriers has reached the usage limit for the two or more one wireless carriers. The predetermined usage threshold for the account may include a usage limit for two or more wireless carriers in combination. The determining whether the account usage data has reached the predetermined usage threshold may further include determining, with the policy management platform, whether the account usage data for the two or more wireless carriers in combination has reached the usage limit for the two or more wireless carriers in combination.

There has thus been outlined, rather broadly, certain aspects of the disclosure in order that the detailed description thereof herein may be better understood, and in order that the present contribution to the art may be better appreciated. There are, of course, additional aspects of the disclosure that will be described below and which will also form the subject matter of the claims appended hereto.

In this respect, before explaining at least one aspect of the disclosure in detail, it is to be understood that the disclosure is not limited in its application to the details of construction and to the arrangements of the components set forth in the following description or illustrated in the drawings. The disclosure is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods, and systems for carrying out the several purposes of the disclosure. It is important, therefore, that the claims be regarded as including such equivalent constructions insofar as they do not depart from the spirit and scope of the disclosure.

BRIEF DESCRIPTION OF THE DRAWINGS

The above mentioned features and aspects of the disclosure will become more apparent with reference to the following description taken in conjunction with the accompanying drawings wherein like reference numerals denote like elements and in which:

FIG. 12 illustrates a process of a carrier or network reporting usage data to the MVNO policy management platform, in accordance with aspects of the present disclosure.

DETAILED DESCRIPTION

Figure 1:
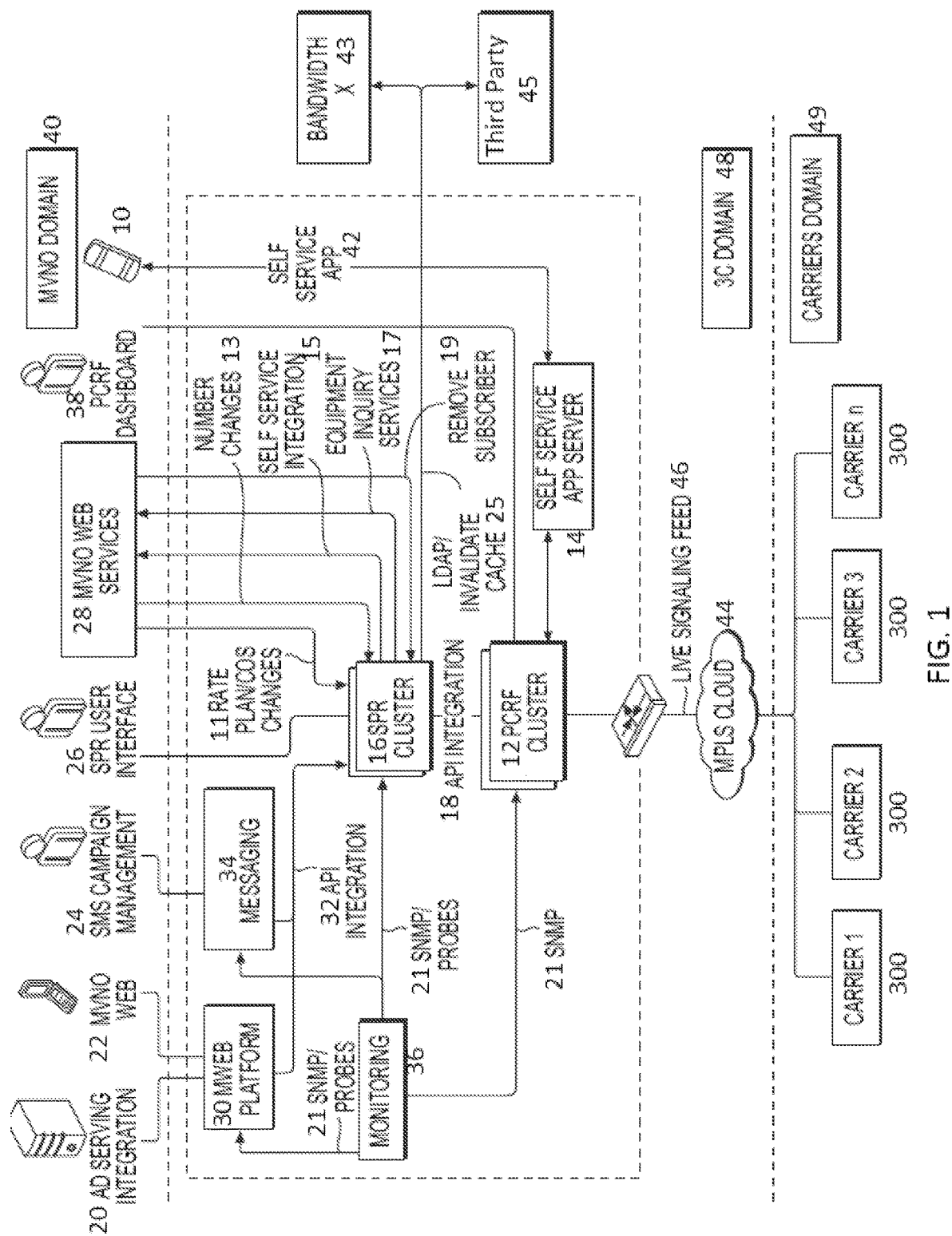
FIG. 1 illustrates components and a flow chart for a Mobile Virtual Network Operator (MVNO) user to oversee at least one wireless carrier or network through a policy management platform, in accordance with aspects of the present disclosure.

In this specification and claims it is to be understood that reference to a wireless device is intended to encompass electronic devices such as mobile phones, tablet computers, gaming systems, MP3 players, personal computers, PDAs, and the like. A "wireless device" is intended to encompass any compatible mobile technology computing device that can connect to a wireless communication network, such as mobile phones, mobile equipment, mobile stations, user equipment, cellular phones, smartphones, handsets, or the like (e.g., Apple iPhone, Google Android based devices, BlackBerry based devices, other types of PDAs or smartphones), wireless dongles, remote alert devices, machine to machine device (M2M), wireless Fidelity hotspot, Internet of things (IoT) device or other mobile computing devices that may be supported by a wireless network. The term "wireless device" may be interchangeably used and referred to herein as "wireless handset," "handset," "mobile device," "device," "mobile phones," "mobile equipment," "mobile station," "user equipment," "cellular phone," "smartphones," "monitoring device" or "phone."

Wireless devices may connect to a "wireless network" or "network" and are intended to encompass any type of wireless network to obtain or provide mobile phone services through the use of a wireless device, such as the Global System for Mobile Communication (GSM) network, Code-Division Multiple Access (CDMA) network, 2G network, 3G network, 4G network, Long-Term Evolution (LTE) network, 5G network that may utilize the teachings of the present application to sell, activate, monitor, redeem, and/or track, the use of one or more wireless devices.

Reference in this specification to "one aspect," "an aspect," "other aspects," "one or more aspects" or the like means that a particular feature, structure, or characteristic described in connection with the aspect is included in at least one aspect of the disclosure. The appearances of, for example, the phrase "in one aspect" in various places in the specification are not necessarily all referring to the same aspect, nor are separate or alternative aspects mutually exclusive of other aspects. Moreover, various features are described which may be exhibited by some aspects and not by others. Similarly, various requirements are described, which may be requirements for some aspects but not for other aspects.

It may be desirable for a service provider to rely on the infrastructure of one or more carriers for tracking usage data by receiving a signaling feed from the carriers. It may also be desirable for a service provider to incorporate wireless traffic generated through Wi-Fi partners of the service account to a policy management solution to control and offer new packages related to Wi-Fi traffic. A system allowing for such usage tracking may provide a better customer experience, a faster time-to-market, a lower total cost of ownership, and increased profitability of the service provider.

The policy management solution disclosed herein may combine all carrier feeds into one platform where service plans can be created and/or monitored across multiple carriers. The policy management solution may also allow the service provider to make real-time decisions related to subscriber access to network resources based on factors such as volume, speed, application type, and/or priority. Real-time control over what, when, where, and how subscribers may access content and services may allow the service provider to deliver innovative and personalized services that enhance end-user experience.

Generally, companies that provide post-paid wireless services are wireless carriers or Mobile Network Operators (MNO) that maintain and control their own wireless networks. An MNO heavily relies on backend systems to address any provisional, billing, security, and data issues that might threaten the health of their networks. On the other hand, a Mobile Virtual Network Operator (MVNO) is a mobile operator that typically does not own its own frequency spectrum or have its own network infrastructure. MVNOs negotiate and enter into business agreements with third party wireless carriers or MNOs to purchase the right to use their networks for wireless services including volume of data and number of minutes/text messages used.

A large number of wireless service plans exist for customers desiring wireless services such as data, talk, text messaging, and/or the like. The wireless providers of those services need to be able to monitor and track usage of any wireless device associated with a wireless account. Each wireless device associated with the wireless account may use a variety of carriers and networks, thus the wireless providers of these services must be able to determine the use of any and all wireless devices linked to the account from any and all carriers and networks providing a usage platform for the devices. This monitoring and managing of account usage can be accomplished with the disclosed system that collects all account usage data from any source providing service to the wireless devices and communicates with those sources in order to manage usage of the account.

Convenience, timeliness, and reliability of the wireless providers' systems are key factors that play into a user's experience. By developing a system to improve at least these factors, a more positive experience can be provided to the user. The improved experience will help retain a customer base and increase the amount of customers willing to purchase wireless services from MNOs and MVNOs. In order to do so, the following needs can be addressed by with a system, method, and device for tracking the use of wireless devices across multiple networks.

The device, system, and method may allow for receiving data usage from each carrier or network used, updating the user account to reflect the data usage received from each network, determining whether a magnitude of data usage from any or all carriers has exceeded a maximum value, determining whether to terminate usage, sending enforcement requests to carriers, and verifying data usage. The disclosure provides an exemplary implementation in a MVNO environment. However, the disclosure is equally applicable to implementation in a MNO environment.

FIG. 1 illustrates components and a flow chart for the connection of a Mobile Virtual Network Operator (MVNO) user to at least one wireless carrier or network through a policy management platform, in accordance with aspects of the present disclosure. Referring now to FIG. 1, components of a system providing wireless access to a wireless device 10 to a variety of wireless networks, which may include one or more carriers 300, through a policy management platform 12 are shown. The wireless device 10 and/or user may connect to the policy management platform 12 (also called a Policy and Charging Rules Function (PCRF) Cluster) via a self-service application server 14 or other means. The policy management platform 12 may communicate with a subscriber profile repository (SPR) cluster element 16 via an Active Programming Interface (API) integration element 18 in order to verify and authenticate the wireless device 10 user account. The policy management platform 12 and the SPR cluster element 16 may each have one or more processors or servers (not shown) configured to perform the operations described herein, and may have one or more transceivers (not shown) capable of transmitting and receiving data on a communication channel as described herein. The system may include an API integration element 18 that may be a hardware and/or software interface, which facilitates the communication between processes and platforms.

The SPR cluster element 16 can provide additional services from a variety of sources that may be implemented as servers, including an ad serving integration element 20, the MVNO mobile web element 22, an SMS campaign management element 24, an SPR user interface element 26, MVNO web services element 28, and the like. Each of these sources may have one or more processors or servers (not shown) to perform the functions described herein. The ad serving integration element 20 may provide advertisements to the wireless device 10, and the MVNO mobile web element 22 may provide mobile Internet service to the wireless device 10. Both of the ad serving integration element 20 and the MVNO mobile web element 22 may interface with the SPR cluster element 16 via a mobile web platform element 30 and an API integration element 32. The SMS campaign management element 24 may provide SMS messaging to the wireless device 10 and may interface with the SPR cluster element 16 via a messaging element 34 and an API integration element 32. The mobile web platform element 30 and the messaging element 34 may be monitored with a monitoring system 36 that may communicate with the SPR cluster element 16 via a simple network management protocol (SNMP) 21. The MVNO web services element 28 may communicate rate and plan changes 11, device number changes 13, self-service integration 15, equipment inquiry service 17, remove subscriber requests 19, and the like to and from the SPR cluster element 16. The one or more of the above-noted aspects or elements may be implemented by a processor, computer, and/or server that may include software.

The SPR cluster element 16 may work with 2G networks, 3G networks, 4G networks, LTE networks, 5G networks, a network implementing a communication channel as defined herein, and other technologies on one or more platforms. The SPR cluster element 16 may provide and/or perform location management, subscriber authentication, call handling, message handling, data usage, and the like. The use of the SPR cluster element 16 may allow personalized services for a variety of user domains and may simplify usage with user subscriptions that can be verified and authenticated by the SPR cluster element 16. The SPR cluster element 16 may also communicate with a third party 45 via a lightweight directory access protocol (LDAP) element 25 or the like, and the third party 45 may communicate with a bandwidth X system provider 43 (for price setting, tracking use, securely automating connections, and ensuring quality of service). The use of the LDAP element 25 or a similar application protocol may allow for the communication of profile information in a way that is carrier-neutral.

The policy management dashboard element 38 (also known as a Policy and Charging Rules Function dashboard (PCRF dashboard)) may be integrated with the policy management platform 12. The policy management dashboard element 38 may facilitate the communication of user and account data and analytics with the policy management platform 12. The wireless device 10 in the MVNO domain 40 may also communicate directly with the policy management platform 12 or, for example, via a self-service application server 42. In one aspect, the wireless device 10 may submit a balance request through the self-service application server 42, which may electronically communicate with the policy management platform 12 to request the user's account balance information. The policy management platform 12 may provide the account balance information to the self-service application server 42, which may transmit that information back to the wireless device 10 for display and/or processing.

The policy management platform 12 may be configured to electronically communicate with a multiprotocol label switching (MPLS) cloud element 44 via, for example, a live signaling feed 46. The MPLS cloud element 44 may be scalable and may allow for protocol-independent communication. The MPLS cloud element 44 may allow the wireless device 10 to be connected via the policy management platform 12 to a variety of wireless networks associated with one or more carriers 300 as shown (carrier 1, carrier 2, carrier 3, . . . carrier n as shown). While the policy management platform 12 may be within the MVNO domain 40, the MPLS cloud element 44 may be "edge-based" in a domain 48 (e.g., a 3C domain) outside of the carrier domain 49 of any wireless carrier 300 to which the MPLS cloud element 44 may connect the wireless device 10. The MPLS cloud element 44 may have one or more processors and transceivers (not shown) configured to perform the functions described herein.

The MPLS cloud element 44 may receive a data packet and may determine based on the type of the data packet where to route that data packet. The MPLS cloud element 44 may use a routing table to determine where to transmit the data packet based on the type of data packet. The MPLS cloud element 44 may also employ a virtual private network (VPN) which may receive data packets. In one aspect, the MPLS cloud element 44 may operate on or near the exterior edge of a carrier 300 to efficiently allow user access to a corresponding carrier domain 49.

The wireless networks may communicate with the MPLS cloud element 44 to access the wireless device 10 associated with the MVNO user account. Based on a selection of a network made by the wireless device 10, the MPLS cloud element 44 may switch the connection of the wireless device 10 to the selected network. The selection of a network may be indicated by a data packet sent to the MPLS cloud element 44. The MPLS cloud element 44 may receive that data packet and, based on a routing table stored therein, determine which network the MPLS cloud element 44 should connect to the wireless device 10. One or more users associated with the MVNO user account may connect to one or more networks so that there may be more than one wireless device 10 associated with the MVNO account connected to the same or a different network at the same time.

Each wireless carrier 300 may have its own SPR cluster (not shown) to verify and authenticate the wireless devices 10 associated with a user account. Each wireless carrier 300 may also have its own policy management platform (not shown) to track account usage. The wireless carriers 300 may communicate, via their policy management platforms back through the MPLS cloud element 44 and to the policy management platform 12, usage data associated with the MVNO account for any and all wireless devices 10 connected to the wireless carrier 300. Likewise, a wireless network such as a Wi-Fi network may also track usage and communicate that usage back through the MPLS cloud element 44 and to the policy management platform 12. In this manner, the MPLS cloud element 44 may allow the policy management platform 12 to collect and aggregate all usage data associated with an MVNO account even when the usage data may come from a variety of wireless networks. Each network may employ a home location register and/or home subscriber server (not shown), each of which may provide a subscriber database and database management protocol for a variety of platforms and wireless devices 10.

Figure 2:
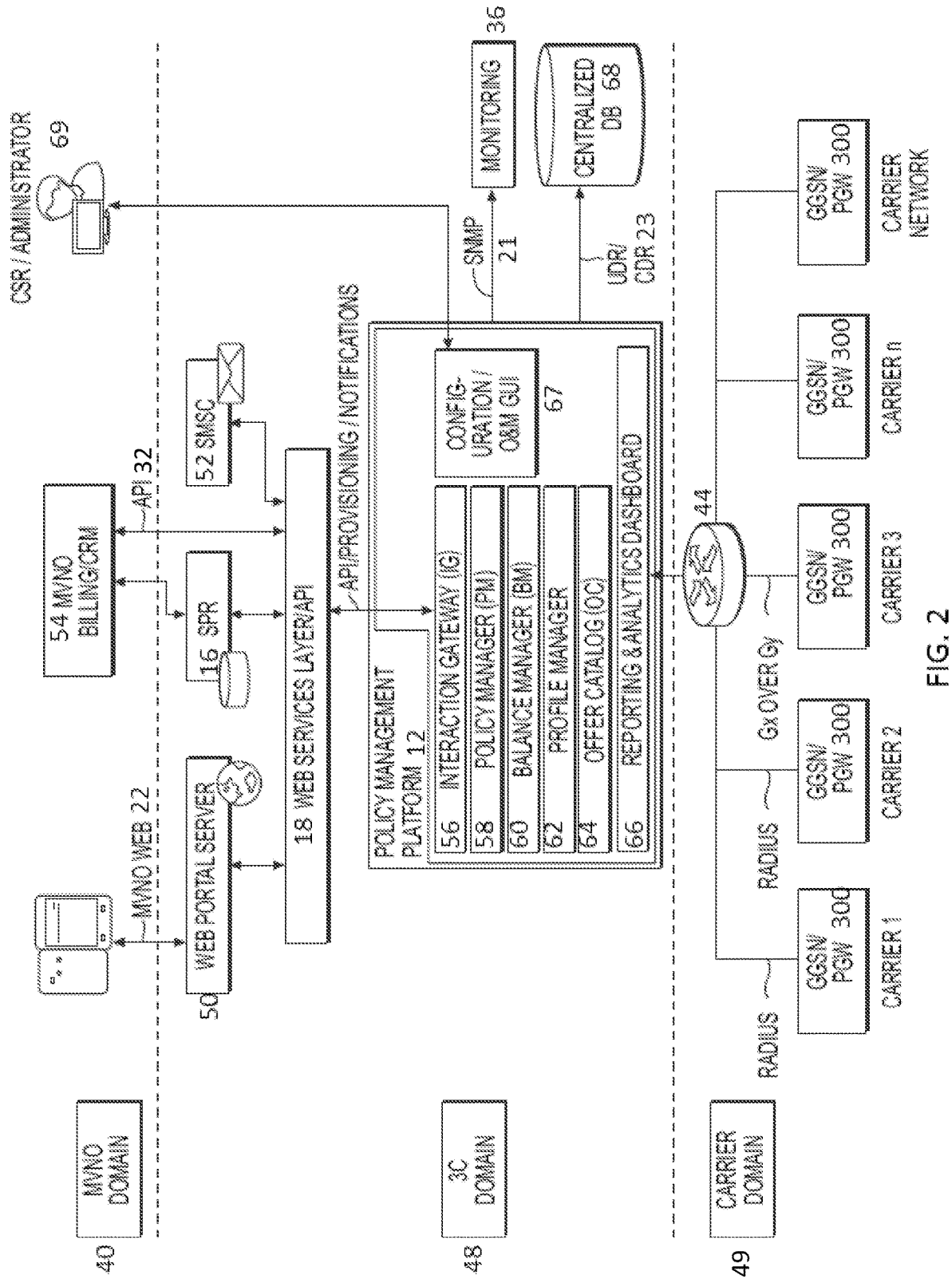
FIG. 2 illustrates a detailed view of the policy management platform through which the MVNO user supervises at least one wireless carrier or network, in accordance with aspects of the present disclosure.

FIG. 2 illustrates a detailed view of the policy management platform through which a MVNO user may connect to at least one wireless carrier or network, in accordance with aspects of the present disclosure. In particular, FIG. 2 shows a more detailed view of the policy management platform 12. As shown in FIG. 2, the policy management platform 12 may connect to a web portal server 50, the SPR cluster element 16, and a short message service center (SMSC) element 52 via a web services layer or API integration element 18. The web portal server 50 may connect the wireless device 10 on the MVNO mobile web element 22 to the policy management platform 12. The MVNO billing system 54 may connect to the policy management platform 12 via the SPR cluster element 16 or more directly through the API integration element 18. The MVNO billing system 54 may maintain account records, billing records, and the like for users registered for service on the MVNO.

The policy management platform 12 may have an interaction gateway 56, a policy manager (also called a Policy and Charging Rules Function) element 58, a balance manager element 60, a profile manager element 62, an offer catalog element 64, a reporting and analytic dashboard element 66, and the like. The policy management platform 12 may also communicate with a monitoring system 36 and a centralized database 68 for monitoring and storing of usage data.

The interaction gateway 56 may communicate with the SPR cluster element 16 to find and retrieve a user profile. If a user profile is invalid or has not yet been updated, the interaction gateway 56 may notify the policy manager element 58 and balance manager element 60. The interaction gateway 56 may also notify the API integration element 18 when data usage for the MVNO account on the MVNO billing system 54 has reached or surpassed a threshold value that may represent the maximum usage for which a user has pre-paid.

The policy manager element 58 may receive usage data from a network, the usage data corresponding to the usage of the wireless device 10 associated with a registered MVNO account, and may communicate a user profile request to the interaction gateway 56. If the user profile is invalid, the policy manager element 58 may receive a notification from the interaction gateway 56. If the user profile is valid, however, the policy manager element 58 may receive the user profile from the profile manager element 62. When the user profile is valid, the policy manager element 58 may also indicate to the balance manager element 60 that a session is open. The policy manager element 58 may, as it receives usage data, communicate to the balance manager element 60 that the usage data has reached or surpassed a predetermined usage threshold that may represent the maximum usage for which a user has pre-paid.

The predetermined usage threshold may vary based on the user, the wireless device 10, the carrier 300, and/or the network. For example, each carrier 300 or network may have a predetermined usage limit for all combined users associated with the MVNO user account. Similarly, each carrier 300 or network may have a predetermined usage limit for each user or each wireless device 10, or any combination of users or wireless devices 10. When the policy manager element 58 receives usage data, it may determine that a particular user or wireless device 10 or combination of multiple users and/or wireless devices 10 has reached the predetermined usage threshold. The predetermined usage threshold may also vary based on each carrier 300 or network such that all users and/or wireless devices 10 on the MVNO account may combine all of their usage on a particular carrier 300 or network or on a combination of carriers 300 or networks to reach the predetermined usage threshold. Likewise, the predetermined usage threshold may not depend on the carrier 300 or network, thus when MVNO account usage from one or more wireless carriers 300 or networks reaches the predetermined usage threshold, regardless of where the usage was occurring, the policy manager element 58 may indicate to the balance manager element 60 that the predetermined usage threshold has been reached for one or more wireless devices 10 associated with the MVNO account.

The balance manager element 60 may receive notifications from the interaction gateway 56 that the user profile has not yet been updated. For example, if a user has not yet established credit in the user account on the MVNO billing system 54, the balance manager element 60 may create a default credit amount for a limited time. The default credit amount may contain one or more usage thresholds corresponding to one or more time or data limits for one or more wireless devices 10 on the account. Once the user profile has been established, the balance manager element 60 may receive a request from the policy manager element 58 to establish a usage session for the account and may provide notification to the policy manager element 58 that the usage session has begun.

The balance manager element 60 may also receive account usage updates, which may be provided by the policy manager element 58. If a user has reached a predetermined account usage threshold, the balance manager element 60 may provide notification to both the policy manager element 58 and the interaction gateway 56. The balance manager element 60 may also provide user account balance information to the interaction gateway 56.

The profile manager element 62 may receive user profile updates from the interaction gateway 56 and may provide those user profile updates to the policy manager element 58. When a balance and/or threshold have been created, the profile manager element 62 may receive an acknowledgment from the interaction gateway 56. When a subscriber uses the wireless device 10 on a network, the profile manager element 62 may receive a user profile lookup request from the policy manager element 58 and may notify the interaction gateway 56 that the user profile is valid or invalid.

The policy management platform 12 may also use a simple network management protocol (SNMP) element 21 to communicate with a monitoring system 36 to monitor data usage. The policy management platform 12 may transmit call detail records (CDRs) and/or usage detail records (UDRs) 23 to a centralized database 68 for storage of usage data.

The policy management platform 12 may be edge-based, meaning that it may be external to and proximately located relative to a carrier domain 49, but between the carrier domain 49 and the MVNO domain 40 in order to capture usage data in a manner that is as close to real-time as possible. The edge-based location of the policy management platform 12 may allow for more efficient usage tracking and management by being able to quickly collect and aggregate usage data from any wireless carrier 300 or network that is authorized for use on any wireless device 10 associated with the MVNO user account. The policy management platform 12 may connect to a variety of wireless networks via the MPLS cloud element 44, and the MPLS cloud element 44 may collect account usage data from any carrier or network 300 used by the MVNO account and transmit that data to the policy management platform 12. The MPLS cloud element 44 may communicate with networks via an application such as "Gx over Gy," which may allow for both provisioning and account control, and may employ a Radius accounting application, Diameter accounting application, or the like.

The policy management platform 12 may also have a configuration manager element 67. An administrator element 69 may access the policy management platform 12 via the configuration manager element 67, which may provide a graphical user interface for an administrator element 69 to make changes or updates to the policy management platform 12.

Figure 3:
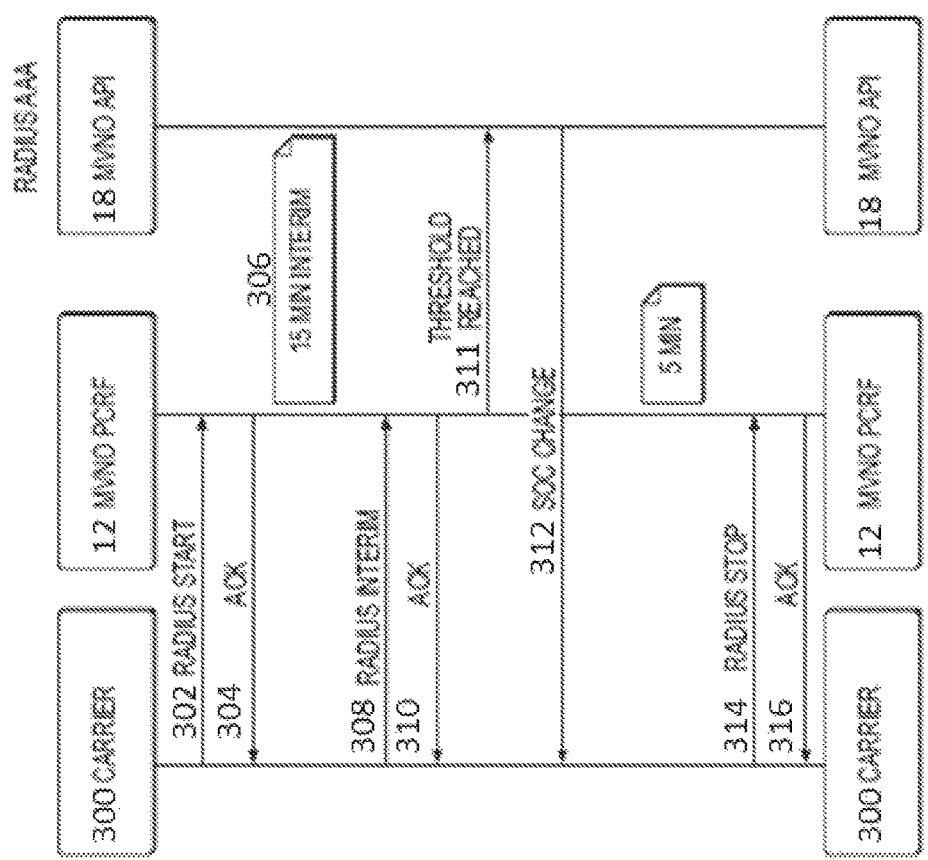
FIG. 3 illustrates a usage data accounting process using a Radius process, in accordance with aspects of the present disclosure.

FIG. 3 illustrates an example of how Radius (Remote access dial-in user service) accounting may be used to communicate usage data from a network to the policy management platform 12. Radius accounting may be used as a type of authentication, authorization, and accounting (AAA) method. The network may transmit a Radius start signal 302 to the policy management platform 12, and the policy management platform 12 may acknowledge 304 to the network that the Radius start signal 302 has been received. An interim time period for usage data reporting may be preset 306, and when that time period has been reached, the network 300 may transmit a Radius interim signal 308 with account usage data to the policy management platform 12. In response, the policy management platform 12 may transmit an acknowledgment 310 to the network. The policy management platform 12 may also transmit a signal to the MVNO API integration element 18 communicating that the usage threshold has been reached 311.

The radius interim signal 308 may contain usage data associated with the MVNO account on the network or carrier 300. The Radius start signal 302 may include user profile information such as an account number, a device number, phone numbers associated with the account, account passwords, network access, device location, session identifiers, and the like.

When access to a network has been granted, a Radius start signal 302 may indicate the start of a user's access. The radius interim signal 308 may update the policy management platform 12 on the status of the user's open session, including usage data. When the user's session with the network ends, a Radius stop signal 314 may indicate that the wireless device 10 user's session has ended with the network.

When the policy management platform 12 determines that the predetermined usage threshold has been reached for account usage, the policy management platform 12 may notify 311 the MVNO API integration element 18. The MVNO API integration element 18 may transmit a state of charge (SOC) change 312 to the wireless carrier or network 300. This SOC change 312 may be an enforcement request for the carrier or network 300 to terminate service with the wireless device 10 that has reached the predetermined usage threshold or for all wireless devices 10 associated with the MVNO account that are connected to the carrier 300 or network. After a period of time, for example five minutes as shown in FIG. 3, after a user's service has been terminated, the network may transmit a Radius stop signal 314 to the policy management platform 12 to notify the policy management platform 12 that Radius accounting is stopping. In response, the policy management platform 12 may transmit an acknowledgment signal 316 to the network.

Figure 4:
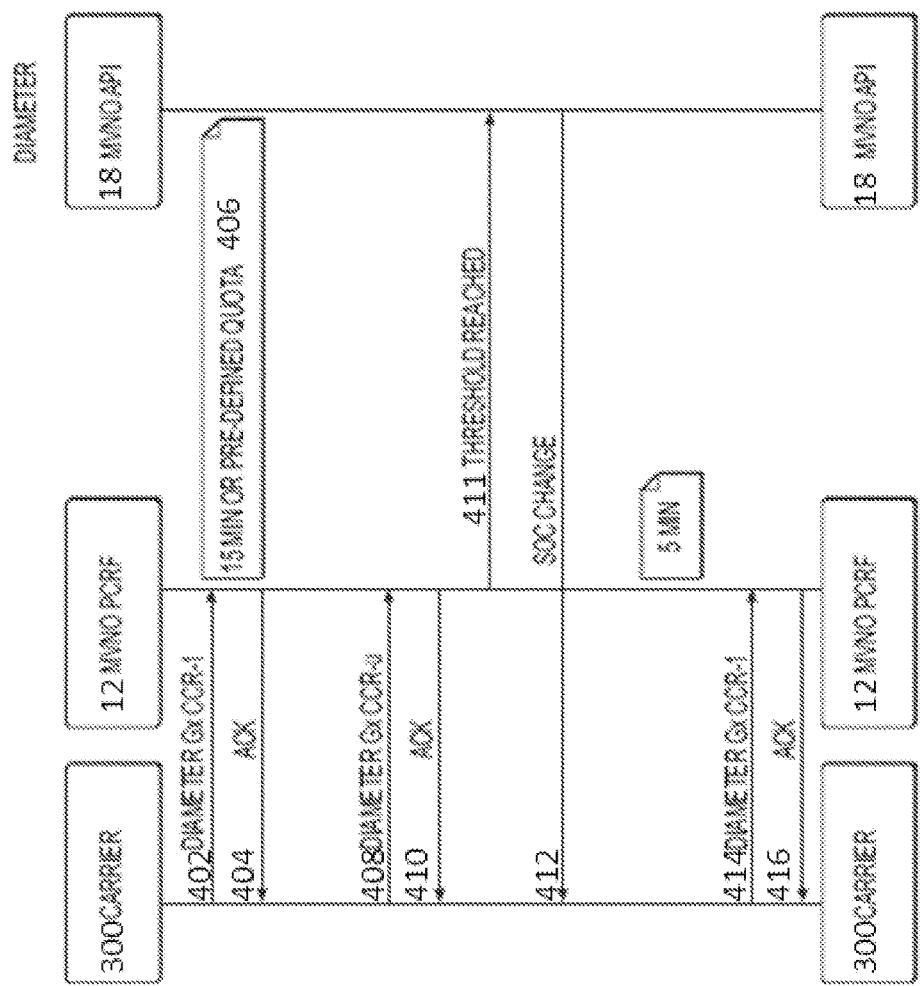
FIG. 4 illustrates a usage data accounting process using a Diameter process, in accordance with aspects of the present disclosure.

FIG. 4 illustrates an example of Diameter accounting, which may facilitate the communication of usage data between a carrier 300 or network to the policy management platform 12. Diameter accounting may have some benefits over Radius accounting, such as bidirectional application models, handling more AAA requests, higher data limits, more efficient transmissions, and so on. The network may transmit a credit control request (CCR) 402 to the MVNO policy management platform 12, which may in return transmit an acknowledgment signal 404 back to the network. After a time interval 406, the network may transmit a CCR update 408 to the MVNO policy management platform 12, which may transmit an acknowledgment signal 410 back to the network. The policy management platform 12 may also determine that the usage with a particular carrier or network 300 has reached the predetermined usage threshold and may signal 411 to the MVNO API integration element 18 that the threshold has been reached. In response, the MVNO API integration element 18 may transmit an SOC change signal 412 to the network. This SOC change signal 412 may be an enforcement request for the network to terminate service with the wireless device 10 that has reached the predetermined usage threshold or with all wireless devices 10 associated with the MVNO account and that are connected to the network.

In response to receiving the enforcement request, the network may terminate the connection between the wireless device 10 and the network. After a period of time, for example 5 minutes as shown in FIG. 4, after the service of the wireless device 10 has been terminated by the network, the network may transmit a Diameter CCR signal 414 to the policy management platform 12 to notify the policy management platform 12 that Diameter accounting is stopping. In response, the policy management platform 12 may transmit an acknowledgment signal 416 to the network.

Figure 5:
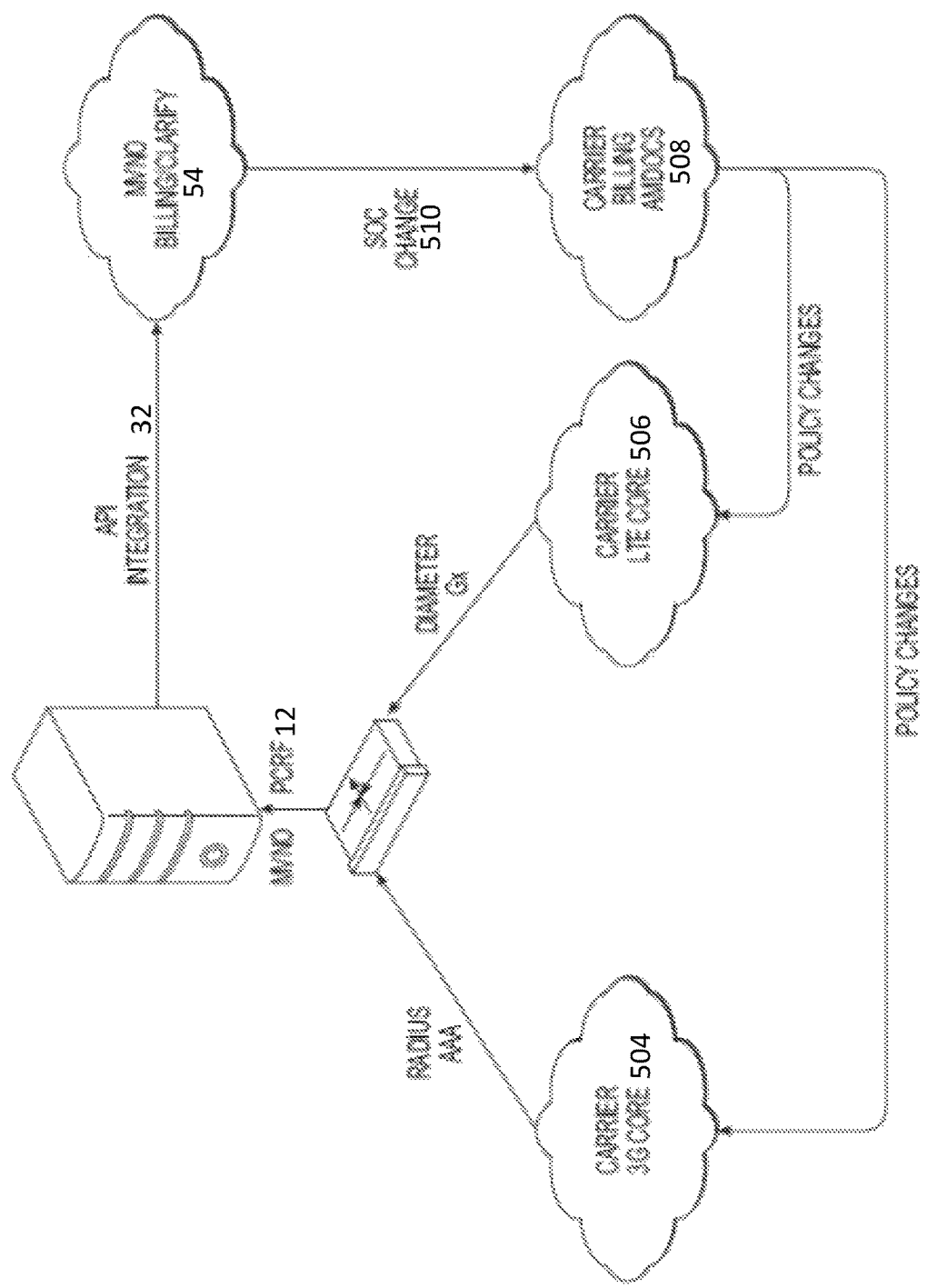
FIG. 5 illustrates the connection of core networks to the MVNO, in accordance with aspects of the present disclosure.

FIG. 5 illustrates the connection of core networks to the MVNO. As shown, the policy management platform 12 may be edge-based and therefore not within or operated by the carrier domain 49. But the policy management platform 12 may be located in between the MVNO billing system 54 and the networks. The edge-based position of the policy management platform 12 may facilitate the efficient collection of account usage data from one or more wireless networks, which may include, for example, a carrier 3G core 504, a carrier LTE core 506, a carrier billing server 508, and/or the like.

The carrier billing server 508 may communicate policy changes to the carrier 3G core 504 and carrier LTE core 506. The policy changes communicated by the carrier billing server 508 may be provided by an SOC change 510 provided by the MVNO billing system 54. The MVNO policy management platform 12 may communicate with the MVNO billing system 54 via the API integration element 32. The policy management platform 12 for the MVNO policy management platform 12 may communicate via Radius and/or Diameter accounting with the 3G core 504, carrier LTE core 506, and the like on the carrier domain 49.

The communication between the MVNO billing system 54 and the carrier billing server 508 may facilitate the communication of account and/or policy changes. The carrier billing server 508 may process account and/or policy changes associated with an MVNO account and communicate the changes to the carrier 3G core 504 and carrier LTE core 506. The proximity of the policy management platform 12 to the carrier 3G core 504 and to the carrier LTE core 506 may improve the speed with which the policy management platform 12 may collect and process user account data for one or more wireless devices 10 associated with the user account.

Figure 6:
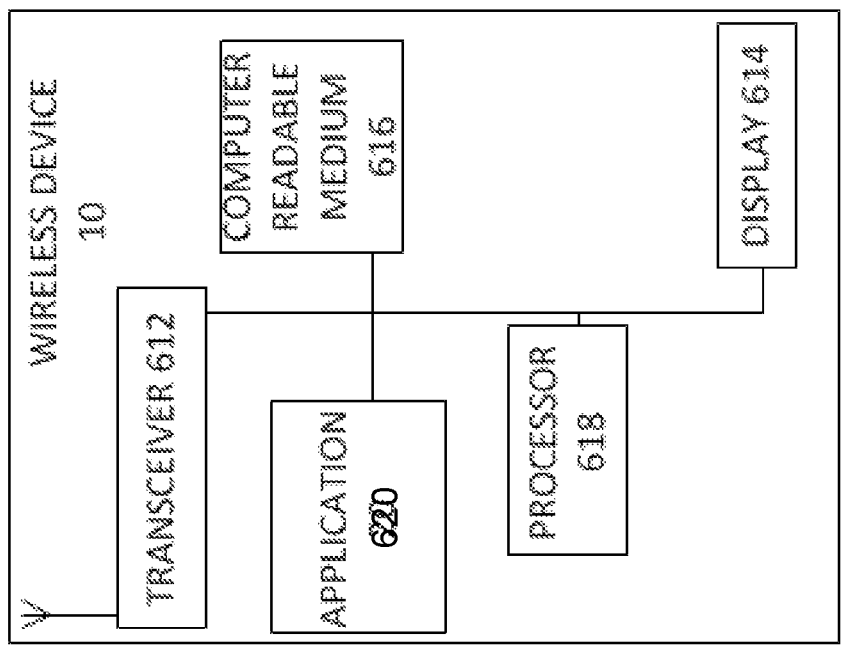
FIG. 6 illustrates an exemplary wireless device, in accordance with aspects of the present disclosure.

FIG. 6 illustrates an exemplary wireless device 10 and its potential components. The wireless device 10 may include a transceiver 612, a display 614, a computer readable medium 616, a processor 618, and an application 620. The transceiver 612 can include, for example, a wireless antenna and associated circuitry capable of data transmission with the network utilizing at least one data transmission protocol, such as, for example, 3G, 4G Long Term Evolution (LTE), Evolution-Data Optimized (EVDO), Code Division Multiple Access (CDMA), High Speed Packet Access (HSPA), Global System for Mobile Communications (GSM), W-CDMA (Wideband Code-Division Multiple Access), Wi-Fi, Bluetooth, a communication channel as defined herein, and/or the like, and/or combinations thereof. The transceiver 612 may transmit and receive data over the data transmission protocol.

The display 614 of the wireless device 10 can be configured to display various information provided to the display 614 from the processor 618 of the wireless device 10, computer readable medium 616, or application 620. The display 614 may be a light-emitting diode display (LED), an electroluminescent display (ELD), a plasma display panel (PDP), a liquid crystal display (LCD), an organic light-emitting diode display (OLED), or any other display technology.

The displayed information can include, for example, the amount of prepaid wireless data service available, the network connection strength, the type of mobile network data connection (such as 3G, 4G, LTE, 5G, EVDO, etc.) the wireless device 10 is connected to, and/or other information potentially useful to the user. The information may be displayed simultaneously or the user may interact with an input device such as buttons on the wireless device 10 or, if the display 614 is a touch-screen, with the icons on the display 614 to cycle through the various types of information for display. For example, the display 614 may simultaneously show on the wireless device 10 the amount of prepaid wireless data service available, the network connection strength, and the type of mobile network data connection. Alternatively, the display 614 may only show one type of information, for example, the amount of prepaid wireless data service available for the wireless device 10 or the account associated with the wireless device 10. The display 614 may then show other types of information if the user interacts with buttons on the wireless device 10 or, if the display 614 is a touch-screen, with icons on the display 614.

The computer readable medium 616 may be configured to store the application 620. For the purposes of this disclosure, computer readable medium 616 stores computer data, which may include computer program code that may be executable by the processor 618 of the wireless device 10 in machine readable form. By way of example, and not limitation, the computer readable medium 616 may include computer readable storage media, for example tangible or fixed storage of data, or communication media for transient interpretation of code-containing signals. Computer readable storage media, as used herein, refers to physical or tangible storage (as opposed to signals) and includes without limitation volatile and non-volatile, removable and non-removable storage media implemented in any method or technology for the tangible storage of information such as computer-readable instructions, data structures, program modules, or other data. In one or more aspects, the actions and/or events of a method, algorithm, or module may reside as one or any combination or set of codes and/or instructions on a computer readable medium 616 or machine readable medium, which may be incorporated into a computer program product. The computer readable medium 616 may also be configured to store the values for the amount of wireless data service available, the amount of wireless data service used, how many days of wireless service have been used, how many days of wireless service remaining, and the like. The computer readable medium 616 may also store information such as the amount of data used for each domain, web address, wireless device 10 application, or other web resource during a given time period, such as, for example, one billing cycle.

Additionally, the computer readable medium 616 may communicate to or display on the display 614 the various metrics described above. For example, the computer readable medium 616 may communicate to or display on the display 614 the amount of wireless data service used, the amount of wireless data service remaining on the account, how many days of wireless service have been used, how many days of wireless service remaining, and the like. Similarly, the computer readable medium 616 may also communicate to or display on the display 614 the amount of data sent and received. Moreover, the computer readable medium 616 may communicate to or display on the display 614 the amount of data that may be remaining from the previously purchased and/or credited amount of data.

The processor 618 may be configured to execute the application 620. The processor 618 can be, for example, dedicated hardware as defined herein, a computing device as defined herein, a microprocessor, a programmable logic array (PLA), a programmable array logic (PAL), a generic array logic (GAL), a complex programmable logic device (CPLD), an application-specific integrated circuit (ASIC), a field-programmable gate array (FPGA), or any other programmable logic device (PLD) configurable to execute the metering client.

The application 620 may be a software application configured to track prepaid data usage and the remaining amount of prepaid data available. The application 620 may be written in any programming language, such as, for example, C, Java, Objective-C, C+, Python, Visual Basic, Perl, or any other programming language the processor 618 is capable of executing. The metering client 620 may also meter how much data has been used on a given domain, web address, wireless device 10 application, or other web resource.

Figure 7:
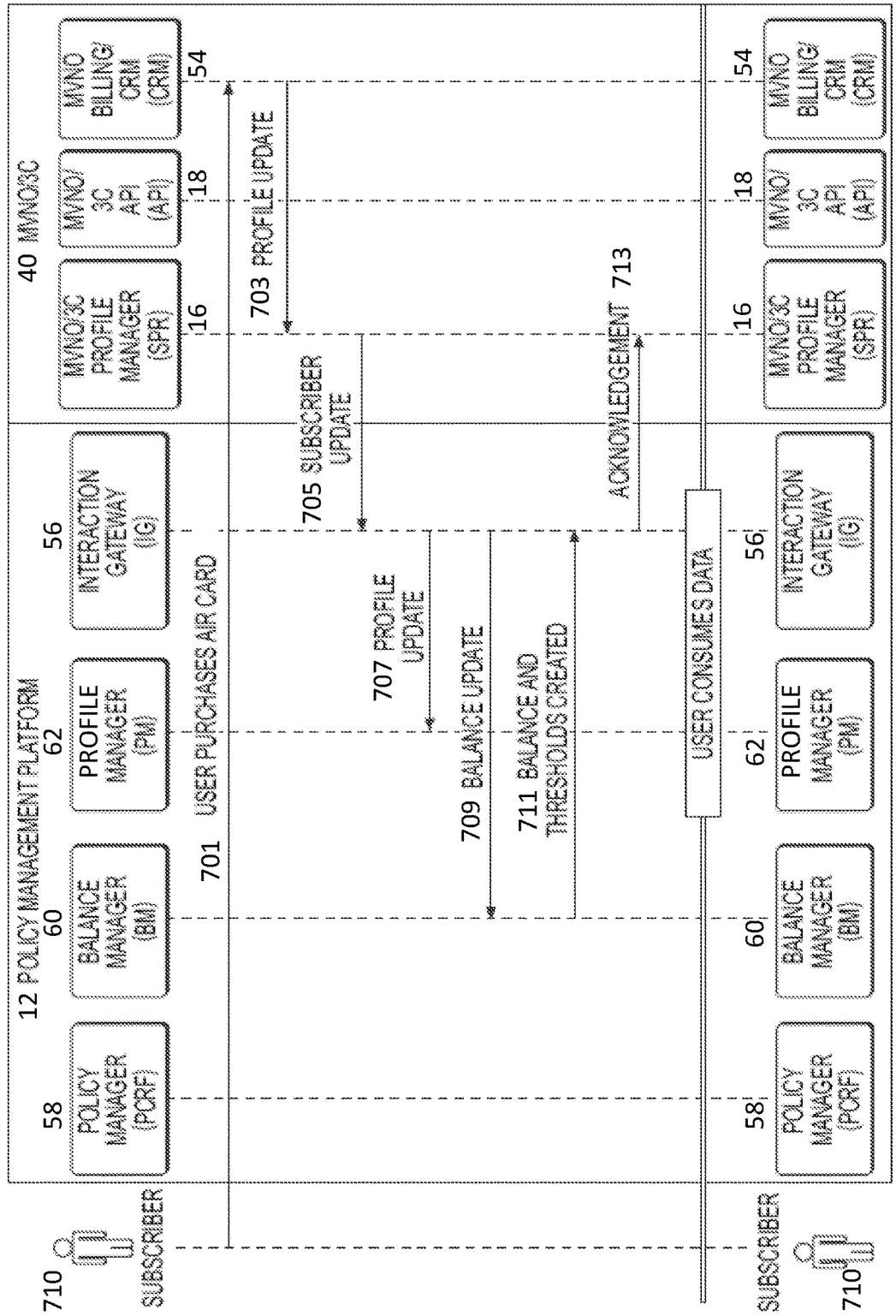
FIG. 7 illustrates a process flow for provisioning a wireless device on an MVNO user account, in accordance with aspects of the present disclosure.

FIG. 7 shows the process of provisioning the wireless device 10 on the MVNO policy management platform 12. The policy management platform 12 may include the policy manager element 58, the balance manager element 60, the profile manager element 62, and the interaction gateway 56. The policy management platform 12 may be configured to communicate with the MVNO domain 40. The MVNO domain 40 may include the SPR cluster element 16, the API integration element 18, and the MVNO billing system 54. Both the policy management platform 12 and the MVNO domain 40 may have one or more processors (not shown) to perform the operations described herein.

First the subscriber 710 may purchase an air time card 701 from a retailer, the air time card 701 represents air time (wireless access including voice, text messages, data, access days, and/or the like). Alternatively or additionally air time may be purchased via the web, over the phone (interactive voice response system), or the like. When a subscriber has purchased air time and associates it with an account, the MVNO billing system 54 may be notified. The MVNO billing system 54 may transmit a profile update signal 703 to the MVNO SPR cluster element 16. The MVNO SPR cluster element 16 may update the subscriber account and may provide a subscriber update 705 to the interaction gateway 56 of the policy management platform 12. The interaction gateway 56 may provide a profile update 707 to the profile manager element 62 and may also provide an account balance update 709 to the balance manager element 60. Upon receiving an account balance update 709, the balance manager element 60 may notify the interaction gateway 56 that an account balance and any thresholds have been created 711. The interaction gateway 56 may then transmit a notification to the MVNO profile manager element 62 to acknowledge 713 that the balance and any thresholds have been created.

Figure 8:
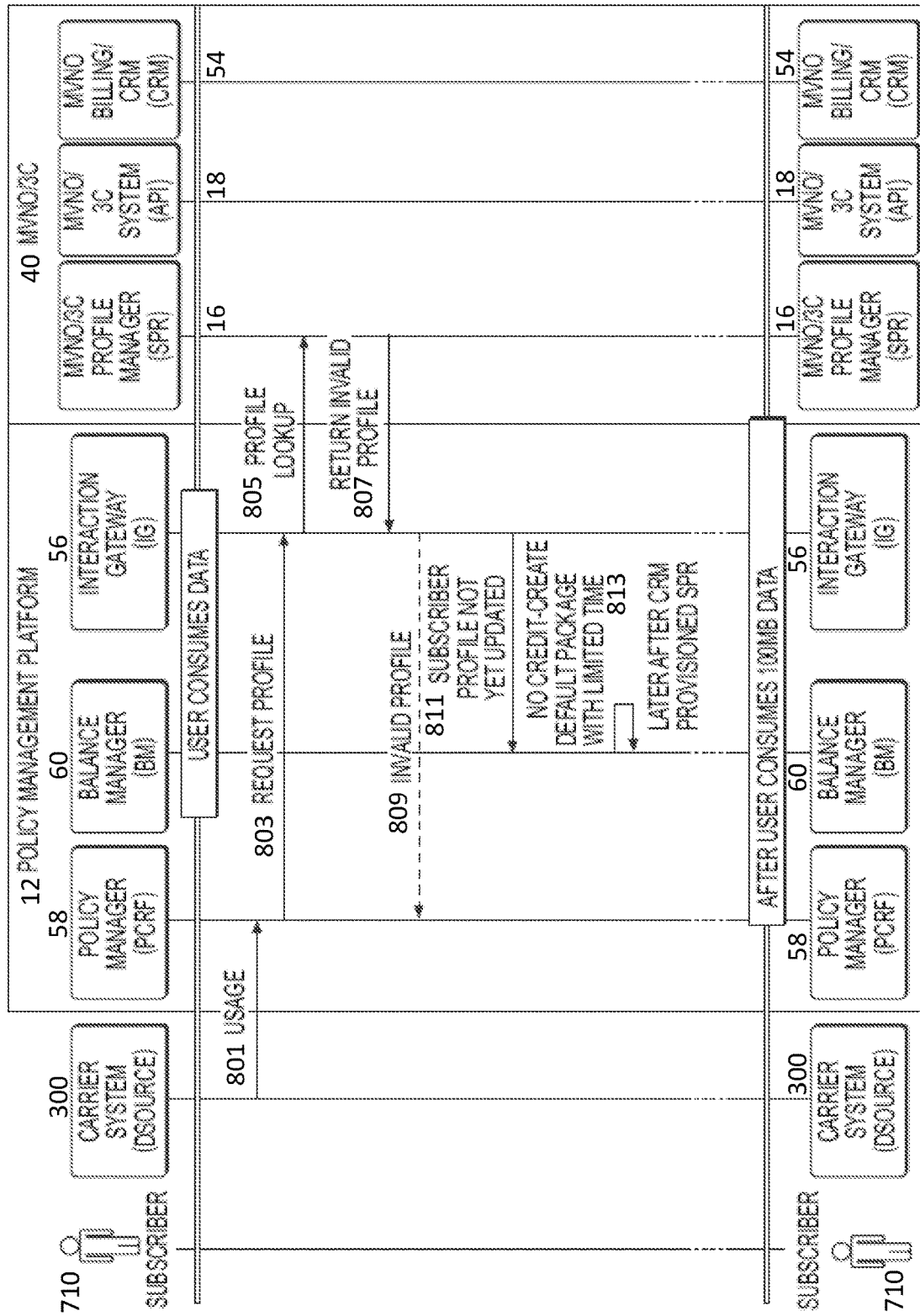
FIG. 8 illustrates a process flow for determining that a wireless device does not have a valid MVNO profile authorized for use, in accordance with aspects of the present disclosure.

FIG. 8 shows the process of provisioning the wireless device 10 on the MVNO policy management platform 12 when a user profile is invalid or has not been updated. The policy management platform 12 may be arranged external to the network, and may include the policy manager element 58, the balance manager element 60, and the interaction gateway 56. The policy management platform 12 may be configured to communicate with the MVNO domain 40. The MVNO domain 40 may include the SPR cluster element 16, the API integration element 18, and the MVNO billing system 54. Both the policy management platform 12 and the MVNO domain 40 may have one or more processors (not shown) to perform the operations described herein.

When a subscriber 710 has connected the wireless device 10 to a network, the network may provide usage data 801 to the policy manager element 58. Upon receiving usage data from the network, the policy manager element 58 may transmit a request profile signal 803 to the interaction gateway 56. The interaction gateway 56 may then transmit a profile lookup request 805 to the MVNO SPR cluster element 16, which may then determine whether the user profile is valid. If the MVNO SPR cluster element 16 determines that the user profile is invalid, the MVNO SPR cluster element 16 may return an invalid profile signal 807 to the interaction gateway 56. Once the interaction gateway 56 has been notified that a user profile request has rendered an invalid profile message, the interaction gateway 56 may transmit an invalid profile signal 809 to the policy manager element 58. The interaction gateway 56 may also notify the balance manager element 60 with a notification signal that the subscriber profile has not yet been updated 811. If there is no credit in the user account, the balance manager element 60 may create a default package with a limited usage time for the account 813.

Figure 9:
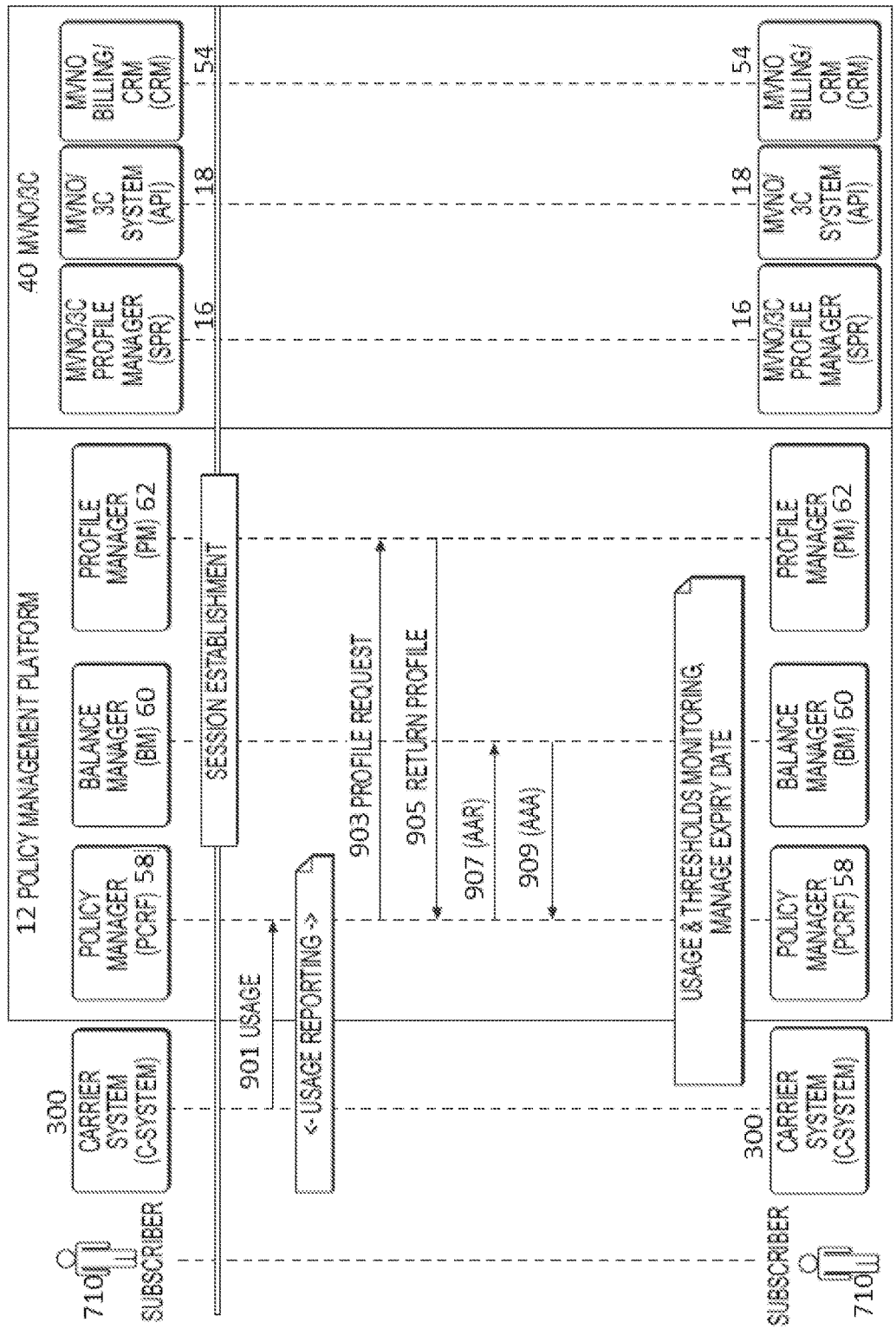
FIG. 9 illustrates a process flow for starting a user session with usage data reporting on the policy management platform, in accordance with aspects of the present disclosure.

FIG. 9 shows the process of starting a user session with usage data reporting on the policy management platform 12. The policy management platform 12 may include the policy manager element 58, the balance manager element 60, and the profile manager element 62. The policy management platform may be arranged externally from the network and may be configured to communicate with the MVNO domain 40. The MVNO domain 40 may include the SPR cluster element 16, the API integration element 18, and the MVNO billing system 54. Both the policy management platform 12 and the MVNO domain 40 may have one or more processors (not shown) to perform the operations described herein.

The network to which a subscriber 710 has connected the wireless device 10 may transmit usage data 901 to the policy manager element 58, which may then transmit a profile request 903 to the profile manager element 62. The profile manager element 62 may transmit a return profile message 905 to the profile manager element 62. Once the profile has been returned to the profile manager element 62, the profile manager element 62 may transmit an authentication and authorization request 907 to the balance manager element 60 to activate a user session. Once the balance manager element 60 has been requested to start a user session, the balance manager element 60 may communicate account balance information to the policy manager element 58 with an authentication and authorization answer 909.

Figure 10:
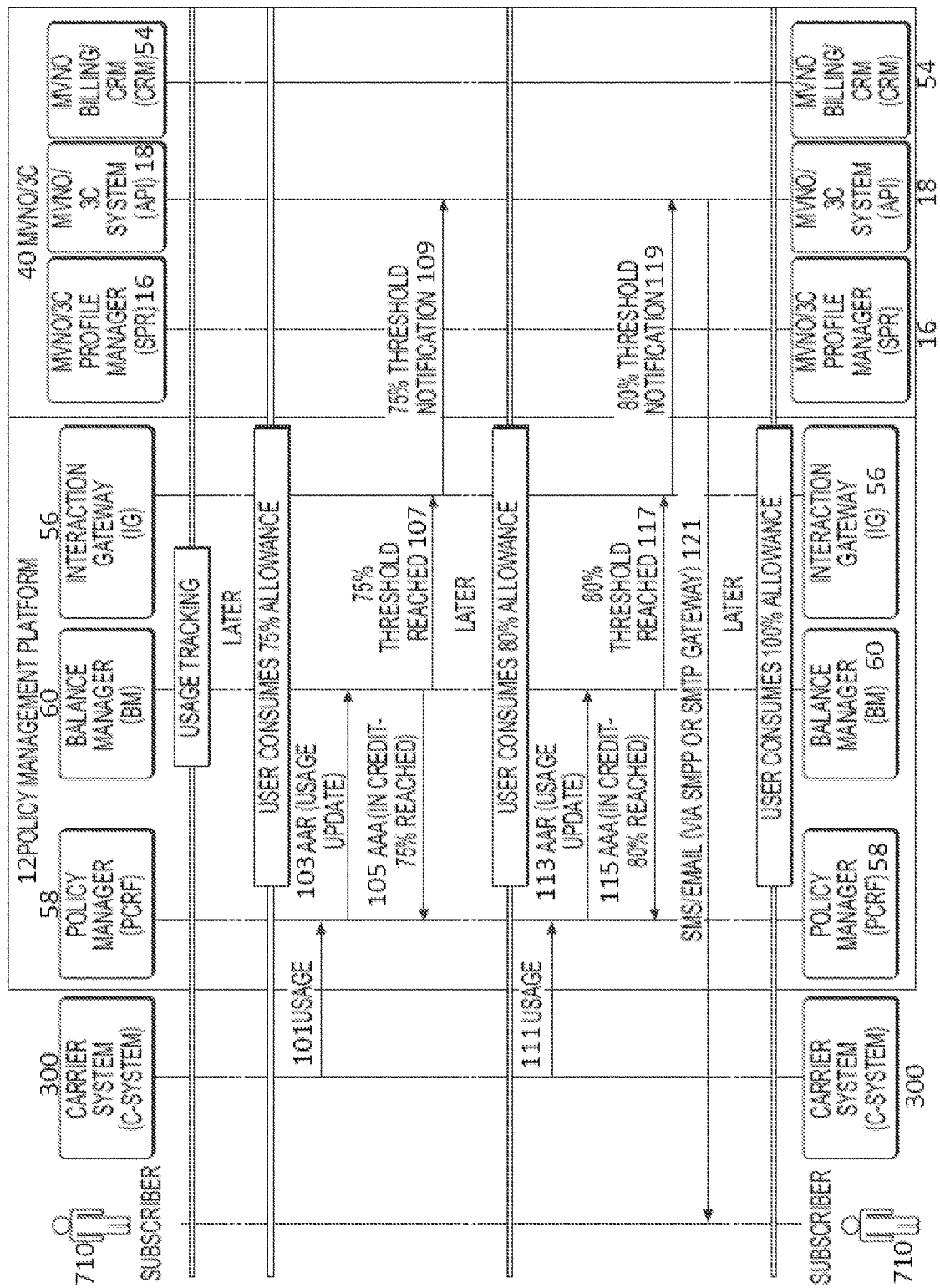
FIG. 10 illustrates a process flow for tracking data consumption associated with the MVNO account and responding to that data consumption reaching predetermined usage thresholds, in accordance with aspects of the present disclosure.

FIG. 10 shows the process of tracking data usage with the policy management platform 12. The policy management platform 12 may be arranged external to the carrier or network 300, and may include the policy manager element 58, the balance manager element 60, and the interaction gateway 56. The policy management platform 12 may be configured to communicate with the MVNO domain 40. The MVNO domain 40 may include the SPR cluster element 16, the API integration element 18, and the MVNO billing system 54. Both the policy management platform 12 and the MVNO domain 40 may have one or more processors (not shown) to perform the operations described herein.

The network to which a subscriber 710 has connected the wireless device 10 may provide usage data 101 to the policy manager element 58. In one example, the data usage reported may exceed a usage threshold set at 75% for the purposes of this example. Upon receiving the data usage from the network, the policy management platform 12 may provide a usage update with an authentication and authorization request 103 to the balance manager element 60. The balance manager element 60 may then transmit an authentication and authorization answer 105 to the policy manager element 58 to indicate that the 75% threshold has been reached. The balance manager element 60 may also notify 107 the interaction gateway 56 that the 75% has been reached. Once the interaction gateway 56 has received notification from the balance manager element 60 that the 75% threshold has been reached, the interaction gateway 56 may transmit a notification 109 to the MVNO API integration element 18 that the 75% threshold has been reached.

When the MVNO API integration element 18 has been notified that the predetermined usage threshold has been reached, the MVNO DOMAIN 40 may determine whether or not to request the network to disconnect the wireless device 10 and whether or not to notify the subscriber 710 that the predetermined usage threshold has been reached. This determination may be performed manually or automatically with one or more processors (not shown). One response the MVNO DOMAIN 40 may choose is to warn the subscriber 710 that any and/or all wireless devices 10 are approaching the usage threshold beyond which the wireless device 10 or all wireless devices 10 on the account may have their access terminated.

Another example of how the MVNO DOMAIN 40 may respond to the notification that usage data has surpassed the predetermined usage threshold may be to transmit a notification 121 to the subscriber's 710 wireless device 10. In such an example, the network may provide usage data 111 to the policy manager element 58. In one example, if the usage threshold is 80%, the policy manager element 58 may transmit an authentication and authorization request 113 with a usage update to the balance manager element 60. The balance manager element 60 may respond with an authentication and authorization answer 115 notifying the policy manager element 58 that the 80% threshold has been reached on the account. The balance manager element 60 may also transmit a notification signal 117 to the interaction gateway 56 that the 80% threshold has been reached. In response, the interaction gateway 56 may transmit a notification 119 to the MVNO API integration element 18 that the 80% threshold has been reached. The MVNO DOMAIN 40 may determine that the subscriber 710 should be notified that the wireless device 10 or all wireless devices 10 have reached the 80% threshold and are approaching the full usage allowance for the account. In such an example, the MVNO API integration element 18 may transmit a message via SMS or email as the notification 121 to the subscriber's 710 wireless device 10 or to all subscriber 710 wireless devices 10. The usage thresholds may be set at any value.

The determination by the MVNO DOMAIN 40 as to whether or not to notify a subscriber's 710 wireless device 10 of usage data may be based on each individual subscriber 710 or wireless device 10, and/or on a predetermined usage amount per carrier 300 or per multiple carriers 300 and/or networks. Thus if one wireless device 10 associated with the MVNO account reaches the predetermined usage threshold for a particular carrier 300 or network or for any combination of carriers 300 and/or networks, the MVNO DOMAIN 40 may notify that wireless device 10 subscriber 710 or any combination of wireless device 10 subscribers 710 associated with the account that the usage threshold has been reached.

Figure 11:
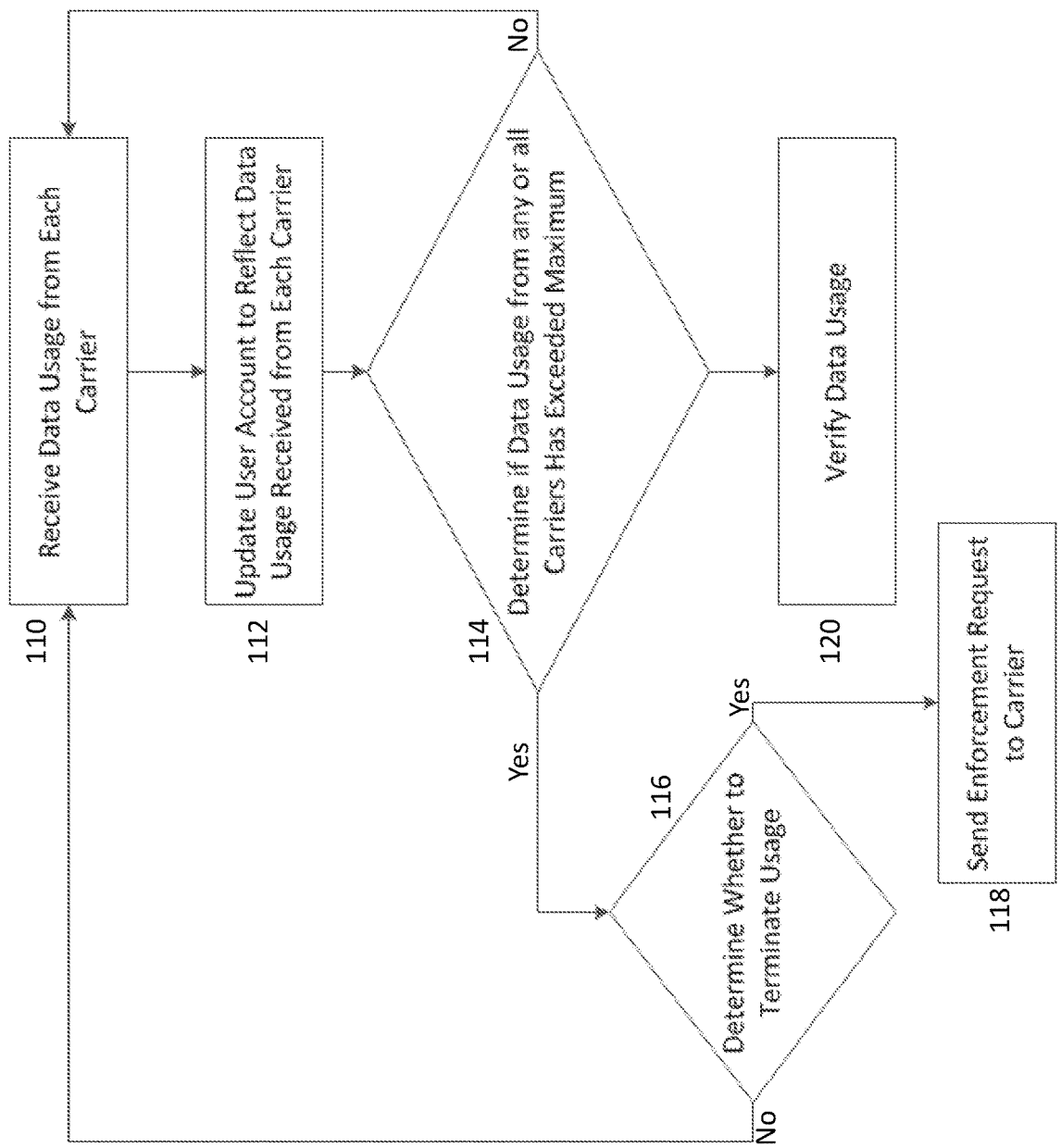
FIG. 11 illustrates a process of tracking usage data and managing the MVNO account with the policy management platform on the MVNO side, in accordance with aspects of the present disclosure.

FIG. 11 illustrates the process of tracking usage data and managing the MVNO account with the policy management platform 12. The edge-based policy management platform 12 may receive 110 usage data from each carrier or network 300 to closely reflect real-time usage. The usage data could include wireless device 10 location, session codes, type of data, type of wireless service, amount of wireless service, provider of wireless service, and the like. The policy management platform 12 may update 112 the MVNO user account based on the usage data collected. The MVNO user account may track usage per carrier 300 or network and/or an aggregate usage data based on any combination of carriers 300 or networks. The MVNO account may also track usage per subscriber 710 and/or wireless device 10 associated with the MVNO account, or may aggregate usage for any combination of subscribers 710 and/or wireless devices 10 associated with the MVNO account.

Based on the usage data collected, the policy management platform 12 may determine 114 whether a magnitude of data usage from any or all carriers 300 and/or networks has exceeded a predetermined maximum value. If not, then the policy management platform 12 may continue to receive 110 usage data from any network 300. If the predetermined maximum value has been exceeded, however, the policy management platform 12 or MVNO DOMAIN 40 may determine 116 whether to terminate usage. Usage termination can include all wireless devices 10 associated with the MVNO account or any combination of wireless devices 10 associated with the MVNO account. If the policy management platform 12 or MVNO DOMAIN 40 determines that usage should be terminated, the policy management platform 12 or MVNO DOMAIN 40 may use an enforcement solution (not shown) which may send 118 a termination request to the network requesting the termination of service of any wireless device 10 associated with the MVNO account. The policy management platform 12 may also verify 120 data usage with each network to ensure that data reporting and collection is accurate. If the policy management platform 12 or the MVNO DOMAIN 40 decides not to terminate usage, the process may continue at step 110 to receive data usage.

FIG. 12 illustrates the process of a network reporting usage data to the MVNO policy management platform 12. When a user attempts to connect the wireless device 10 to a network, the network may authenticate 122 the wireless device 10. The wireless device 10 may connect to a gateway support node (not shown—see FIG. 2 "GGSN/PGW" on carriers and network 300) associated with a carrier 300, and the gateway support node may authenticate 122 an account with an SPR (not shown). A gateway support node may be a router. Authentication 122 can include verifying a user account on the network and whether the network has a service agreement with the MVNO DOMAIN 40. Once a user device has been authenticated 122, the network may start 124 Radius accounting, Diameter accounting, and/or similar wireless service accounting to provide usage data to the MVNO policy management platform 12, as explained above. The network may have its own policy management platform (not shown) to track usage data, and the network may provide 126 interval reports to the MVNO policy management platform 12. If an MVNO DOMAIN 40 or MVNO policy management platform 12 transmits a request to the network to terminate service, the network may receive 128 such enforcement commands and may stop 130 Radius and/or Diameter accounting upon terminating service to the wireless device 10.

Additionally, although the disclosure references specific protocols and processes such as the radius accounting process, the diameter accounting process and the like, the disclosure is equally applicable to any other type of similar protocols and processes. In other words, the disclosure is equally applicable to similar or analogous systems and processes whether currently applied or subsequently established.

Accordingly, as described herein, the policy management solution combines all carrier feeds into one platform where service plans can be created across multiple carriers. The policy management solution allows the service provider to make real-time decisions related to subscriber access to network resources based on factors such as volume, speed, application type, and/or priority. Real-time control over what, when, where, and how subscribers may access content and services may allow the service provider to deliver innovative and personalized services that enhance end-user experience.

Further in accordance with various aspects of the disclosure, the methods described herein are intended for operation with dedicated hardware implementations including, but not limited to PCs, PDAs, SIM cards, semiconductors, application specific integrated circuits (ASIC), programmable logic arrays, cloud computing devices, and other hardware devices constructed to implement the methods described herein.

The disclosure may include communication channels that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an internetwork, a backbone network (BBN), a global area network (GAN), the Internet, an intranet, an extranet, an overlay network, a cellular telephone network, a Personal Communications Service (PCS), using known protocols such as the Global System for Mobile Communications (GSM), CDMA (Code-Division Multiple Access), W-CDMA (Wideband Code-Division Multiple Access), Wireless Fidelity (Wi-Fi), Bluetooth, Long Term Evolution (LTE), 3G, 4G, 5G, EVolution-Data Optimized (EVDO) and/or the like, and/or a combination of two or more thereof.

The disclosure may be implemented in any type of computing devices, such as, e.g., a desktop computer, personal computer, a laptop/mobile computer, a personal data assistant (PDA), a mobile phone, a tablet computer, cloud computing device, and the like, with wired/wireless communications capabilities via the communication channels.

In an aspect, the disclosure may be implemented in any type of mobile smartphones that are operated by any type of advanced mobile data processing and communication operating system, such as, e.g., an Apple™ iOS™ operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system or the like.

It should also be noted that the software implementations of the disclosure as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the disclosure is considered to include a tangible storage medium or distribution medium, as listed herein and including art-recognized equivalents and successor media, in which the software implementations herein are stored.

Aspects of the disclosure may include a server executing an instance of an application or software configured to accept requests from a client and giving responses accordingly. The server may run on any computer including dedicated computers. The computer may include at least one processing element, typically a central processing unit (CPU), and some form of memory. The processing element may carry out arithmetic and logic operations, and a sequencing and control unit may change the order of operations in response to stored information. The server may include peripheral devices that may allow information to be retrieved from an external source, and the result of operations saved and retrieved. The server may operate within a client-server architecture. The server may perform some tasks on behalf of clients. The clients may connect to the server through the network on a communication channel as defined herein. The server may use memory with error detection and correction, redundant disks, redundant power supplies and so on.

Additionally, the various aspects of the disclosure may be implemented in a non-generic computer implementation. Moreover, the various aspects of the disclosure set forth herein improve the functioning of the system as is apparent from the disclosure hereof. Furthermore, the various aspects of the disclosure involve computer hardware that it specifically programmed to solve the complex problem addressed by the disclosure. Accordingly, the various aspects of the disclosure improve the functioning of the system overall in its specific implementation to perform the process set forth by the disclosure and as defined by the claims.

While the device, system, and method have been described in terms of what are presently considered to be specific aspects, the disclosure need not be limited to the disclosed aspects. It is intended to cover various modifications and similar arrangements included within the spirit and scope of the claims, the scope of which should be accorded the broadest interpretation so as to encompass all such modifications and similar structures. The present disclosure includes any and all aspects of the following claims.

We claim:

1. A tracking system for multiple wireless network usage tracking configured to receive wireless usage data from each of a plurality of wireless carriers, the tracking system comprising:
a policy management platform implemented having at least one processor configured to receive the wireless usage data from a switching element that was received from each of the plurality of wireless carriers;
a subscriber profile repository (SPR) cluster element configured to perform at least one of the following: location management, subscriber authentication, call handling, message handling, and data usage;
the policy management platform is configured to communicate with the subscriber profile repository (SPR) cluster element; and
the policy management platform being configured to calculate account usage data associated with an account profile based on the wireless usage data received from each of the plurality of wireless carriers,
wherein the policy management platform is implemented externally from at least one of the plurality of wireless carriers.

2. The tracking system of claim 1, wherein:
the switching element comprises at least one processor;
the policy management platform is configured to exchange authentication, authorization, and accounting communications with each of the plurality of wireless carriers that comprise at least one of the following: Remote Authentication Dial-In User Service (RADIUS) protocol communications and Diameter protocol communications;
the policy management platform is further configured to collect, from at least one gateway support node associated with each of the plurality of wireless carriers, the wireless usage data based on the authentication, authorization, and accounting communications with each of the plurality of wireless carriers; and
the policy management platform is further configured to aggregate the wireless usage data associated with each of the plurality of wireless carriers in the account profile.

3. The tracking system of claim 2, wherein:
the policy management platform is further configured to determine whether the collected and aggregated wireless usage data of the wireless carriers has reached a predetermined usage threshold; and
each of the plurality of wireless carriers implement a subscriber profile repository (SPR).

4. The tracking system of claim 3, wherein:
the policy management platform is further configured to transmit a termination request to one of the wireless carriers in response to determining that the collected and aggregated wireless usage data for one of the wireless carriers has reached the predetermined usage threshold; and
each of the plurality of wireless carriers implement a policy management platform configured to track wireless usage.

5. The tracking system of claim 2, wherein:
each of the plurality of wireless carriers implement a policy management platform configured to track wireless usage;
the policy management platform is further configured to determine whether the collected and aggregated wireless usage data associated with the account profile has exceeded a predetermined usage threshold; and
the switching element is configured to be edge-based in a domain.

6. The tracking system of claim 5, further comprising an enforcement manager, wherein:
the policy management platform is configured to notify the enforcement manager when the wireless usage data associated with the account profile has exceeded the predetermined usage threshold; and
each of the plurality of wireless carriers implement a subscriber profile repository (SPR).

7. The tracking system of claim 1, wherein:
the policy management platform is configured to exchange authentication, authorization, and accounting communications with each of the plurality of wireless carriers that comprise at least one of the following: Remote Authentication Dial-In User Service (RADIUS) protocol communications and Diameter protocol communications, and
the policy management platform is further configured to transmit a notification message to a mobile virtual network operator that the wireless usage data has reached a predetermined usage threshold based on the authentication, authorization, and accounting communications with each of the plurality of wireless carriers.

8. The tracking system of claim 1, wherein:
the policy management platform is configured to exchange authentication, authorization, and accounting communications with each of the plurality of wireless carriers that comprise at least one of the following: Remote Authentication Dial-In User Service (RADIUS) protocol communications and Diameter protocol communications; and the policy management platform is further configured to transmit a message to a wireless device notifying the wireless device that the wireless usage data has exceeded a predetermined usage threshold based on the authentication, authorization, and accounting communications with each of the plurality of wireless carriers.

9. A process for multiple wireless network usage tracking in response to receiving wireless usage data from each of a plurality of wireless carriers with a switching element, the switching element having one or more processors, the process for multiple wireless network usage tracking comprising:

connecting a policy management platform having one or more processors to each of the plurality of wireless carriers through the switching element;

receiving with the policy management platform the wireless usage data from each of a plurality of wireless carriers for an account profile operatively linked to at least one wireless device registered on the account profile and configured to connect to the wireless carriers;

performing with a subscriber profile repository (SPR) cluster element at least one of the following: location management, subscriber authentication, call handling, message handling, and data usage;

communicating between the policy management platform and the subscriber profile repository (SPR) cluster element;

aggregating the wireless usage data at the policy management platform; and determining with the policy management platform, in response to aggregating the wireless usage data, whether the wireless usage data has reached a predetermined usage threshold, wherein the policy management platform is implemented externally from at least one of the plurality of wireless carriers.

10. The process for multiple wireless network usage tracking of claim 9, further comprising exchanging authentication, authorization, and accounting communications between the policy management platform and each of the plurality of wireless carriers to obtain the wireless usage data, wherein receiving the wireless usage data further comprises receiving the wireless usage data transmitted with at least one of the following: a radius protocol from at least one of the wireless carriers and a diameter protocol from at least one of the wireless carriers.

11. The process for multiple wireless network usage tracking of claim 10, wherein each of the plurality of wireless carriers implement a policy management platform configured to track wireless usage; and wherein receiving the wireless usage data comprises receiving the wireless usage data at predetermined time intervals.

12. The process for multiple wireless network usage tracking of claim 9, further comprising transmitting a termination request, with the policy management platform to at least one of the plurality of wireless carriers to terminate a wireless service between the wireless device and at least one of the plurality of wireless carriers; and exchanging authentication, authorization, and accounting communications between the policy management platform and each of the plurality of wireless carriers to obtain the wireless usage data.

13. The process for multiple wireless network usage tracking of claim 9, further comprising exchanging authentication, authorization, and accounting communications between the policy management platform and each of the plurality of wireless carriers to obtain the wireless usage data, wherein the predetermined usage threshold for the wireless usage data comprises a usage limit for each of the plurality of wireless carriers.

14. The process for multiple wireless network usage tracking of claim 13, wherein:

determining whether the wireless usage data has reached the predetermined usage threshold further comprises determining, with the policy management platform, whether the wireless usage data for two or more of the plurality of wireless carriers has reached the usage limit for two or more of the wireless carriers; and each of the plurality of wireless carriers implement a policy management platform configured to track wireless usage.

15. The process for multiple wireless network usage tracking of claim 13, wherein determining whether the wireless usage data has reached the predetermined usage threshold further comprises determining, with the policy management platform, whether the wireless usage data for at least one of the plurality of wireless carriers has reached the usage limit for at least one of the wireless carriers based on the authentication, authorization, and accounting communications with each of the plurality of wireless carriers.

16. The process for multiple wireless network usage tracking of claim 15, further comprising transmitting a termination request, with the policy management platform to at least one of the plurality of wireless carriers, to terminate a wireless service between the wireless device and at least one of the plurality of wireless carriers in response to determining that the wireless usage data for at least one of the wireless carriers has reached the usage limit, wherein each of the plurality of wireless carriers implement a subscriber profile repository (SPR).

17. The process for multiple wireless network usage tracking of claim 16, further comprising verifying the wireless usage data with the policy management platform, wherein the policy management platform is configured to verify the wireless usage data with the plurality of wireless carriers, wherein each of the plurality of wireless carriers implement a policy management platform configured to track wireless usage.

18. The process for multiple wireless network usage tracking of claim 9, further comprising exchanging authentication, authorization, and accounting communications between the policy management platform and each of the plurality of wireless carriers to obtain the wireless usage data, wherein the predetermined usage threshold for the wireless usage data comprises a usage limit for two or more of the plurality of wireless carriers in combination.

19. The process for multiple wireless network usage tracking of claim 18, wherein determining whether the wireless usage data has reached the predetermined usage threshold further comprises determining, with the policy management platform, whether the wireless usage data for the two or more of the plurality of wireless carriers in combination has reached the usage limit for the two or more of the plurality of wireless carriers in combination; and wherein each of the plurality of wireless carriers implement a subscriber profile repository (SPR).

20. A wireless network usage device for multiple wireless network usage tracking configured to receive wireless usage data from a plurality of wireless networks through a switching element for an account profile associated with at least one wireless device, the wireless network usage device having one or more processors configured to:
- aggregate the wireless usage data from each of the wireless networks for the account profile with a policy management platform;
- perform with a subscriber profile repository (SPR) cluster element at least one of the following: location management, subscriber authentication, call handling, message handling, and data usage;
- communicate between the policy management platform and the subscriber profile repository (SPR) cluster element;
- determine whether the aggregate of the wireless usage data from the account profile has reached a predetermined usage threshold with the policy management platform; and
- transmit a termination request with the policy management platform to one or more of the plurality of wireless networks, the termination request requesting termination of a wireless service to the at least one wireless device,
- wherein the policy management platform is implemented externally from at least one of the plurality of wireless networks.

* * * * *